US008853332B2

(12) United States Patent
Hasegawa et al.

(10) Patent No.: US 8,853,332 B2
(45) Date of Patent: *Oct. 7, 2014

(54) CURABLE SILICONE COMPOSITION THAT PROVIDES A HIGHLY TRANSPARENT CURED SILICONE MATERIAL

(75) Inventors: Chiichiro Hasegawa, Awara (JP); Makoto Yoshitake, Funabashi (JP); Hiroshi Akitomo, Ichihara (JP)

(73) Assignee: Dow Corning Toray Co., Ltd., Chiyoda-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/147,320

(22) PCT Filed: Jan. 29, 2010

(86) PCT No.: PCT/JP2010/051660
§ 371 (c)(1),
(2), (4) Date: Aug. 1, 2011

(87) PCT Pub. No.: WO2010/087522
PCT Pub. Date: Aug. 5, 2010

(65) Prior Publication Data
US 2011/0288246 A1 Nov. 24, 2011

(30) Foreign Application Priority Data
Feb. 2, 2009 (JP) ................... 2009-022015

(51) Int. Cl.
*C08G 77/38* (2006.01)
*B05D 3/02* (2006.01)
*C08L 83/04* (2006.01)
*C08G 77/12* (2006.01)
*C08G 77/20* (2006.01)

(52) U.S. Cl.
CPC ............ *C08L 83/04* (2013.01); *C08G 77/12* (2013.01); *C08G 77/20* (2013.01)
USPC .................................. 525/478; 525/477

(58) Field of Classification Search
USPC .................................. 525/478, 477
See application file for complete search history.

(56) References Cited

U.S. PATENT DOCUMENTS

| 3,284,406 | A | 11/1966 | Nelson |
|---|---|---|---|
| 3,294,725 | A | 12/1966 | Findlay et al. |
| 3,425,967 | A | 2/1969 | Modic |
| 3,436,366 | A | 4/1969 | Modic |
| 3,989,666 | A | 11/1976 | Niemi |
| 4,189,545 | A | 2/1980 | Modic |
| 4,221,688 | A | 9/1980 | Johnson et al. |
| 4,248,751 | A | 2/1981 | Willing |
| 4,391,921 | A | 7/1983 | Johnson |
| 4,427,811 | A | 1/1984 | Elias et al. |
| 4,472,470 | A | 9/1984 | Modic |
| 4,473,667 | A | 9/1984 | Sands |
| 4,500,584 | A | 2/1985 | Modic |
| 4,529,789 | A * | 7/1985 | Kroupa ........................ 528/15 |
| 4,535,141 | A | 8/1985 | Kroupa |
| 4,555,529 | A | 11/1985 | Lee et al. |
| 4,559,369 | A | 12/1985 | Bauman et al. |
| 4,572,917 | A | 2/1986 | Graiver et al. |
| 4,584,324 | A | 4/1986 | Bauman et al. |
| 4,624,900 | A | 11/1986 | Fau |
| 4,689,248 | A | 8/1987 | Traver et al. |
| 4,741,861 | A | 5/1988 | Okada et al. |
| 4,753,978 | A | 6/1988 | Jensen |
| 4,788,240 | A | 11/1988 | Fujimoto |
| 4,845,164 | A * | 7/1989 | Gutek ........................ 528/15 |
| 4,876,805 | A | 10/1989 | Peoples |
| 4,882,398 | A | 11/1989 | Mbah |
| 4,891,393 | A | 1/1990 | Hirai et al. |
| 5,135,960 | A | 8/1992 | Higuchi et al. |
| 5,153,231 | A | 10/1992 | Bouquet et al. |
| 5,177,552 | A | 1/1993 | Isogai et al. |
| 5,246,973 | A | 9/1993 | Nakamura et al. |

(Continued)

FOREIGN PATENT DOCUMENTS

| CN | 1802417 A | 7/2006 |
|---|---|---|
| CN | 101107324 A | 1/2008 |

(Continued)

OTHER PUBLICATIONS

Figure Translation of JP04-053872.*
English language abstract for CN 101107324 extracted from the espacenet.com database on Oct. 26, 2012, 8 pages.
English language abstract for JP 02-151660 extracted from the espacenet.com database on Oct. 18, 2012, 19 pages.
English language abstract and translation for JP 07-041679 extracted from the PAJ database on Aug. 26, 2011, 29 pages.
English language abstract JP 2005-042099 extracted from the PAJ database on Oct. 4, 2011, 35 pages.
English language abstract for JP 2006-328102 extracted from the PAJ database on Oct. 4, 2011, 19 pages.
English language abstract and translation for JP 2006-335857 extracted from the PAJ database on Aug. 25, 2011, 34 pages.
English language abstract for JP 2007-131694 extracted from the PAJ database on Oct. 4, 2011, 9 pages.

(Continued)

Primary Examiner — Randy Gulakowski
Assistant Examiner — Christopher M Rodd
(74) Attorney, Agent, or Firm — Howard & Howard Attorneys PLLC

(57) ABSTRACT

A curable silicone composition comprises (A) (A-1) an alkenyl-containing dialkylpolysiloxane and a viscosity of at least 1,000 mPa·s to not more than 20,000 mPa·s and (A-2) an alkenyl-containing, resin-form organopolysiloxane that comprises the $SiO_{4/2}$ unit, $R^1{}_2R^2SiO_{1/2}$ unit, and $R^1{}_3SiO_{1/2}$ unit wherein $R^1$ is alkyl and $R^2$ is alkenyl, that contains from 2.5 to 5.0 mass % alkenyl group, and that has a ratio for the total number of moles of $R^1{}_2R^2SiO_{1/2}$ and $R^1{}_3SiO_{1/2}$ units to 1 mole of the $SiO_{4/2}$ unit in the range from 0.70 to 1.10; (B) an organopolysiloxane that contains at least 0.9 mass % silicon-bonded hydrogen; and (C) a hydrosilylation reaction catalyst. The curable composition provides a bending-tolerant and highly transparent cured silicone material that has a hardness in the range from 80 to 95, and a parallel light transmittance at 200° C. of a value that is at least 99% of the parallel light transmittance at 25° C.

6 Claims, No Drawings

(56) References Cited

U.S. PATENT DOCUMENTS

| | | | |
|---|---|---|---|
| 5,332,762 A | 7/1994 | Maschberger et al. | |
| 5,348,392 A | 9/1994 | Bouguet et al. | |
| 5,362,761 A | 11/1994 | Uragami et al. | |
| 5,373,078 A | 12/1994 | Juen et al. | |
| 5,399,402 A | 3/1995 | Inoue et al. | |
| 5,717,010 A | 2/1998 | Ward et al. | |
| 5,764,181 A | 6/1998 | Fey et al. | |
| 5,827,921 A | 10/1998 | Osawa et al. | |
| 5,908,878 A | 6/1999 | Baity et al. | |
| 5,929,143 A | 7/1999 | Ward et al. | |
| 5,977,226 A | 11/1999 | Dent et al. | |
| 6,084,002 A | 7/2000 | Nicholson et al. | |
| 6,124,407 A | 9/2000 | Lee et al. | |
| 6,262,170 B1 | 7/2001 | Kilgour et al. | |
| 7,459,213 B2 | 12/2008 | Yamamoto et al. | |
| 7,521,813 B2 | 4/2009 | Kashiwagi et al. | |
| 7,683,125 B2 | 3/2010 | Shirasaki et al. | |
| 7,687,563 B2 | 3/2010 | Shirasaki et al. | |
| 7,732,519 B2 | 6/2010 | Shirasaki et al. | |
| 7,767,754 B2 | 8/2010 | Zhu et al. | |
| 8,129,480 B2 | 3/2012 | Takanashi et al. | |
| 8,227,520 B2 | 7/2012 | Shirasaki et al. | |
| 2004/0152825 A1 | 8/2004 | Yamamoto et al. | |
| 2005/0006794 A1 | 1/2005 | Kashiwagi et al. | |
| 2006/0264583 A1 | 11/2006 | Kashiwagi et al. | |
| 2006/0293445 A1 | 12/2006 | Araki et al. | |
| 2007/0015868 A1 | 1/2007 | Shirasaki et al. | |
| 2007/0099007 A1 | 5/2007 | Benayoun et al. | |
| 2007/0123828 A1 | 5/2007 | Propp | |
| 2007/0129508 A1 | 6/2007 | Kashiwagi | |
| 2008/0021125 A1 | 1/2008 | Shirasaki et al. | |
| 2008/0160322 A1 | 7/2008 | Mochizuki et al. | |
| 2009/0118441 A1 | 5/2009 | Yamamoto et al. | |
| 2009/0263936 A1* | 10/2009 | Fujisawa et al. | 438/118 |
| 2009/0292056 A1 | 11/2009 | Shirasaki et al. | |
| 2010/0197870 A1 | 8/2010 | Kashiwagi et al. | |
| 2011/0021649 A1 | 1/2011 | Sakuma et al. | |
| 2011/0077344 A1 | 3/2011 | Hasegawa et al. | |
| 2011/0190410 A1 | 8/2011 | Nozoe et al. | |
| 2011/0281123 A1 | 11/2011 | Yoshida et al. | |
| 2011/0294950 A1 | 12/2011 | Hasegawa et al. | |

FOREIGN PATENT DOCUMENTS

| | | | |
|---|---|---|---|
| EP | 0240162 | 10/1987 | |
| EP | 0522585 A1 | 1/1993 | |
| EP | 0636662 A2 | 2/1995 | |
| EP | 0997498 A1 | 5/2000 | |
| EP | 1627900 A1 | 2/2006 | |
| EP | 1724308 A1 | 11/2006 | |
| JP | 54135865 A | 10/1979 | |
| JP | 59012830 A | 1/1984 | |
| JP | 59012832 A | 1/1984 | |
| JP | 61103945 A | 5/1986 | |
| JP | 61108640 A | 5/1986 | |
| JP | 02-151660 A | 6/1990 | |
| JP | H 04-339863 A | 11/1992 | |
| JP | 05-070692 | 3/1993 | |
| JP | 5209080 A | 8/1993 | |
| JP | H 05-271544 A | 10/1993 | |
| JP | 06-207038 | 7/1994 | |
| JP | 6287348 A | 10/1994 | |
| JP | 07-041679 | 2/1995 | |
| JP | 07-053872 A | 2/1995 | |
| JP | 7247436 A | 9/1995 | |
| JP | 7122000 B | 12/1995 | |
| JP | 11-130963 | 5/1999 | |
| JP | 11-236508 | 8/1999 | |
| JP | 2000-129132 A | 5/2000 | |
| JP | 2001-164187 A | 6/2001 | |
| JP | 2002-114860 | 4/2002 | |
| JP | 2003-012925 A | 1/2003 | |
| JP | 2003-096223 | 4/2003 | |
| JP | 2004-091569 | 3/2004 | |
| JP | 2004-143332 | 5/2004 | |
| JP | 2004-346248 | 12/2004 | |
| JP | 2005-042099 | 2/2005 | |
| JP | 2005-062534 | 3/2005 | |
| JP | 2005-161132 A | 6/2005 | |
| JP | 2005-227701 A | 8/2005 | |
| JP | 2005-255968 | 9/2005 | |
| JP | 2006-328102 | 12/2006 | |
| JP | 2006-335857 | 12/2006 | |
| JP | 2006/350634 A | 12/2006 | |
| JP | 2007-131694 | 5/2007 | |
| JP | 2008-163060 | 7/2008 | |
| JP | 2008214625 A | 9/2008 | |
| JP | 2008-274270 A | 11/2008 | |
| JP | 2010-018662 A | 1/2010 | |
| WO | WO 03102063 A2 | 12/2003 | |
| WO | WO 2004074378 A1 | 9/2004 | |
| WO | WO 2004/104105 A1 | 12/2004 | |
| WO | WO 2005085357 A1 | 9/2005 | |
| WO | WO 2007/055395 A1 | 5/2007 | |
| WO | WO 2007055395 A1 * | 5/2007 | C08L 83/04 |
| WO | WO 2008/047892 | 4/2008 | |
| WO | WO 2008/096882 | 8/2008 | |
| WO | WO 2010/013847 A1 | 2/2010 | |
| WO | WO 2010/087523 A1 | 8/2010 | |
| WO | WO 2010/087525 A1 | 8/2010 | |

OTHER PUBLICATIONS

International Search Report for Application No. PCT/JP2010/051660 dated Jun. 2, 2010, 3 pages.
International Search Report for Application No. PCT/JP2010/051661 dated Jun. 2, 2010, 3 pages.
International Search Report for Application No. PCT/JP2010/051663 dated Jun. 2, 2010, 3 pages.
English language abstract for JP 05-070692 extracted from the PAJ database on Sep. 15, 2011, 8 pages.
English language abstract for JP 5209080 extracted from the espacenet.com database on Sep. 16, 2011, 6 pages.
English language abstract and translation for JP 06-207038 extracted from the PAJ database on Aug. 2, 2011, 42 pages.
English language abstract for JP 6287348 extracted from the espacenet.com database on Sep. 16, 2011, 11 pages.
English language abstract and original document not available for JP 7122000. However, see English language equivalent US 5332762.
English language abstract for JP 7247436 extracted from the espacenet.com database on Sep. 16, 2011, 7 pages.
English language abstract and translation for JP 11-130963 extracted from the PAJ database on Sep. 16, 2011, 31 pages.
English language abstract and translation for JP 11-236508 extracted from the PAJ database on Aug. 2, 2011, 37 pages.
English language abstract not available for JP 54135865. However, see English language equivalent US 4189545. Foreign document extracted from the espacenet.com database on Sep. 16, 2011, 13 pages.
English language abstract not available for JP 59012830. However, see English language equivalent US 4473667. Foreign document extracted from the espacenet.com database on Sep. 16, 2011, 9 pages.
English language abstract not available for JP 59012832. However, see English language equivalent US 439121. Foreign document extracted from the espacenet.com database on Sep. 16, 2011, 8 pages.
English language abstract not available for JP 61108640. However, see English language equivalent US 4559369. Foreign document extracted from the espacenet.com database on Sep. 16, 2011, 14 pages.
English language abstract not available for JP 61103945. However, see English language equivalent US 4572917. Foreign document extracted from the espacenet.com database on Sep. 16, 2011, 12 pages.
English language abstract and translation for JP 2002-114860 extracted from the PAJ database on Aug. 2, 2011, 50 pages.
English language abstract and translation for JP 2003-096223 extracted from the PAJ database on Aug. 2, 2011, 45 pages.
English language abstract and translation for JP 2004-091569 extracted from the PAJ database on Sep. 16, 2011, 29 pages.

(56) References Cited

OTHER PUBLICATIONS

English language abstract and translation for JP 2004-143332 extracted from the PAJ database on Aug. 2, 2011, 39 pages.
English language abstract and translation for JP 2004-346248 extracted from the PAJ database on Aug. 2, 2011, 35 pages.
English language abstract and translation for JP 2005-062534 extracted from the PAJ database on Aug. 2, 2011, 40 pages.
English language abstract and translation for JP 2005-255968 extracted from the PAJ database on Aug. 2, 2011, 44 pages.
English language abstract and translation for JP 2008-163060 extracted from the PAJ database on Aug. 2, 2011, 52 pages.
English language abstract for JP 2008214625 extracted from the espacenet.com database on Aug. 2, 2011, 16 pages.
English language abstract for WO 2004074378 extracted from the espacenet.com database on Sep. 16, 2011, 32 pages.
English language abstract for WO 2005085357 extracted from the espacenet.com database on Aug. 2, 2011, 32 pages.
International Search Report for Application No. PCT/JP2004/002883 dated Jul. 6, 2004, 4 pages.
International Search Report for Application No. PCT/JP2008/052203 dated May 16, 2008, 2 pages.
International Search Report for Application No. PCT/JP2009/063910 dated Dec. 15, 2009, 5 pages.
International Search Report for Application No. PCT/JP2008/064080 dated Dec. 22, 2008, 3 pages.
English language abstract and machine-assisted English translation for WO 03102063 extracted from the espacenet.com database on Mar. 12, 2013, 36 pages.
English language abstract and machine-assisted English translation for JP 2005-227701 extracted from the espacenet.com database on Feb. 20, 2014, 42 pages.
English language abstract and machine-assisted English translation for JP 2008-274270 extracted from the espacenet.com database on Feb. 20, 2014, 63 pages.
English language abstract for WO 2008/047892 extracted from the espacenet.com database on Feb. 20, 2014, 23 pages.
English language abstract and machine-assisted English translation for JP 07-053872 extracted from the PAJ database on Oct. 14, 2013, 34 pages.
English language abstract and machine-assisted English translation for JP 2001-164187 extracted from the PAJ database on Oct. 14, 2013, 34 pages.
English language abstract and machine-assisted English translation for JP 2003-012925 extracted from the PAJ database on Oct. 16, 2013, 26 pages.
English language abstract and machine assisted English translation for JP 2005-161132 extracted from the PAJ database on Oct. 14, 2013, 49 pages.
English language abstract and machine-assisted English Translation for JP 2010-018662 extracted from the PAJ database on Oct. 16, 2013, 40 pages.
English language abstract not available for CN 1802417; however, see English language equivalent US 2009/0292056. Orginal document extracted from the espacenet.com database on Oct. 28, 2013, 17 pages.
English language abstract and machine-assisted English translation for JP 2000-129132 extracted from the PAJ database on Oct. 14, 2013, 45 pages.
English language abstract and machine-assisted translation for JP 2006/350634 extracted from the PAJ database on Oct. 28, 2013, 109 pages.
English language abstract for WO 2004/104105 extracted from the espacenet.com database on Oct. 28, 2013, 28 pages.
English language abstract for WO 2010/013847 extracted from the espacenet.com database on Sep. 16, 2011, 42 pages.
English language abstract for JPH 04-339863 extracted from the PAJ database on Jun. 16, 2014, 7 pages.
English language abstract not found for JPH 05-271544; however, see English language equivalent U.S. 5,929,143. Original document extracted from espacenet.com database on Jun. 16, 2014, 12 pages.

\* cited by examiner

CURABLE SILICONE COMPOSITION THAT PROVIDES A HIGHLY TRANSPARENT CURED SILICONE MATERIAL

RELATED APPLICATIONS

This application claims priority to and all the advantages of International Patent Application No. PCT/JP2010/051660, filed on Jan. 29, 2010, which claims priority to Japanese Patent Application No. JP 2009-022015, filed on Feb. 2, 2009.

TECHNICAL FIELD

The present invention relates to a curable silicone composition that provides a flexible and highly transparent cured silicone material. The present invention more particularly relates to a curable silicone composition that contains a resin-form organopolysiloxane and that provides a flexible and highly transparent cured silicone material that does not undergo temperature-induced changes in its transparency.

BACKGROUND ART

Curable silicone compositions that contain a resin-form organopolysiloxane and that provide a highly transparent cured silicone material are known. For example, JP 2005-042099 (Equivalent to US 2005-0006794 A1) A describes a silicone rubber composition comprising an organopolysiloxane that has at least two aliphatically unsaturated bonds in each molecule; an organopolysiloxane having a resin structure and comprising the $SiO_2$ unit, an $R_3SiO_{0.5}$ unit having 2-3 vinyl groups, and an $R_3SiO_{0.5}$ unit having 0-1 vinyl group, wherein the non-vinyl R in these formulas is monovalent hydrocarbyl that does not contain an aliphatically unsaturated bond, e.g., methyl and so forth; an organohydrogenpolysiloxane that has at least two silicon-bonded hydrogen atoms in each molecule; and a platinum group metal-based catalyst. In the following, the $SiO_2$ unit is referred to as the Q unit and the $R_3SiO_{0.5}$ unit is referred to as the M unit.

The polyorganosiloxane composition described in JP 2006-335857 A provides a transparent cured material and comprises a straight-chain polyorganosiloxane containing silicon-bonded alkenyl and having a viscosity at 23° C. of 10 to 10,000 mm$^2$/s; a branched polyorganosiloxane comprising the Q unit, an M unit having one vinyl group, and an M unit that does not contain an aliphatically unsaturated bond; a polyalkylhydrogensiloxane comprising the Q unit, an M unit having one silicon-bonded hydrogen atom, and an M unit that does not contain silicon-bonded hydrogen; and a platinum group metal compound.

The curable silicone composition described in JP 2007-131694 A (equivalent to US2009-0118441 A1) comprises at least a diorganopolysiloxane that has at least two alkenyl groups in each molecule; at least two resin-form organopolysiloxanes that have different mass-average molecular weights, each comprising the Q unit, an M unit having one vinyl group, and an M unit that does not contain an aliphatically unsaturated bond; an organopolysiloxane that has at least two silicon-bonded hydrogen atoms in each molecule; and a hydrosilylation reaction catalyst.

JP 2006-328102 A (equivalent to US2006-0264583 A1) describes a silicone polymer composition for lens molding, that characteristically provides a colorless and transparent cured material and that comprises as its essential components an organopolysiloxane that has at least two aliphatically unsaturated bonds in each molecule and a viscosity of at least 100 mPa·s at 25° C., an organohydrogenpolysiloxane that has at least three $H(CH_3)_2SiO_{1/2}$ units in each molecule, and a platinum group metal catalyst.

However, the cured silicone materials provided by the cure of such compositions have a poor flexibility and are prone to breakage during mold-based molding and during component assembly processes, and it has also not been possible to use them in applications that demand bendability due to use in a flexed or bent condition. In addition, the cured silicone materials provided by the cure of these compositions are subject to temperature-induced changes in transparency, and problems due to optical property variations are then produced when these cured silicone materials are used over a broad temperature range.

PATENT REFERENCES

Patent Reference 1: JP 2005-042099 A
Patent Reference 2: JP 2006-335857 A
Patent Reference 3: JP 2007-131694 A
Patent Reference 4: JP 2006-328102 A

DISCLOSURE OF INVENTION

An object of the present invention is to provide a curable silicone composition that forms a flexible and highly transparent cured silicone material that is free of surface tack and that does not undergo temperature-induced changes in its transparency.

The curable silicone composition of the present invention characteristically comprises
(A) 100 mass parts of an alkenyl-containing organopolysiloxane comprising
  (A-1) a dialkylpolysiloxane that has an average of at least two alkenyl groups in each molecule and a viscosity at 25° C. of at least 1,000 mPa·s to not more than 20,000 mPa·s, at from 50 mass % to not more than 70 mass % of component (A), and
  (A-2) an alkenyl-containing, resin-form organopolysiloxane that comprises the $SiO_{4/2}$ unit, $R^1{}_2R^2SiO_{1/2}$ unit, and $R^1{}_3SiO_{1/2}$ unit wherein $R^1$ is $C_{1-10}$ alkyl and $R^2$ is alkenyl, that contains from 2.5 to 5.0 mass % alkenyl group, and that has a ratio for the total number of moles of $R^1{}_2R^2SiO_{1/2}$ and $R^1{}_3SiO_{1/2}$ units to 1 mole of the $SiO_{4/2}$ unit in the range from 0.70 to 1.10, at from 30 mass % to not more than 50 mass % of component (A);
(B) an organopolysiloxane that contains at least 0.9 mass % silicon-bonded hydrogen wherein the silicon-bonded groups other than the silicon-bonded hydrogen are $C_{1-10}$ alkyl, in an amount that provides 0.8 to 2 moles silicon-bonded hydrogen in this component per 1 mole of the total alkenyl in component (A); and
(C) a hydrosilylation reaction catalyst in a catalytic quantity, and provides a bending-tolerant and highly transparent cured silicone material that characteristically has a hardness measured using the type A durometer specified in JIS K 6253 in the range from 80 to 95, an elongation as specified in JIS K 6251 of at least 30%, a parallel light transmittance at 25° C. measured in accordance with JIS K 7105 on a 6 mm optical path length of at least 90%, and a parallel light transmittance value at 200° C. that is at least 99% of the parallel light transmittance at 25° C.

The aforementioned component (B) preferably is an organopolysiloxane comprising
  (B-1) an organopolysiloxane that contains at least 0.9 mass % silicon-bonded hydrogen and that comprises the $SiO_{4/2}$ unit and $HR^3{}_2SiO_{1/2}$ unit wherein $R^3$ is $C_{1-10}$ alkyl, at 50 to 100 mass % of component (B), and (B-2) a straight-chain organopolysiloxane that contains at least 0.9 mass % silicon-bonded hydrogen wherein the silicon-bonded groups other than the silicon-bonded hydrogen are $C_{1-10}$ alkyl, at 0 to 50 mass % of component (B).

The cured silicone material of the present invention characteristically exhibits bending tolerance and a high transparency and is characteristically provided by the thermosetting of the aforementioned curable silicone composition and has a hardness measured using the type A durometer specified in JIS K 6253 in the range from at least 80 to not more than 95, an elongation as specified in JIS K 6251 of at least 30%, a parallel light transmittance at 25° C. measured in accordance with JIS K 7105 on a 6 mm optical path length of at least 90%, and a value for the parallel light transmittance at 200° C. that is at least 99% of the parallel light transmittance at 25° C.

The cured silicone composite according to the present invention characteristically comprises a substrate that forms a single article with a cured silicone layer that is provided by the cure of the previously described curable silicone composition. This cured silicone composite can be obtained by coating the previously described curable silicone composition on a substrate and then thermosetting the curable silicone composition.

The curable silicone composition of the present invention, because it comprises a special alkenyl-functional dialkylpolysiloxane and a special alkenyl-functional, resin-form organopolysiloxane, characteristically provides a flexible and highly transparent cured silicone material that is free of surface tack wherein the transparency of the cured material is not altered by temperature. Because it is flexible, the cured silicone material provided by the cure of this composition characteristically resists breakage during mold-based molding and component assembly processes and thus exhibits an excellent moldability and handling characteristics, and can also be used in applications that demand bendability, for example, use in a flexed or bent condition. In addition, because the present composition does not contain silicon-bonded aryl, for example, phenyl, the cured silicone material provided by the cure of the present composition characteristically does not suffer from a reduction in transparency even when held under high temperature, high humidity conditions or when exposed to ultraviolet radiation.

BEST MODE FOR CARRYING OUT THE INVENTION

The alkenyl-containing organopolysiloxane that is component (A) is the base component of the present composition and comprises (A-1) a dialkylpolysiloxane that has an average of at least two alkenyl groups in each molecule and a viscosity at 25° C. of at least 1,000 mPa·s to not more than 20,000 mPa·s, at from 50 mass % to not more than 70 mass % of component (A), and (A-2) an alkenyl-containing, resin-form organopolysiloxane that comprises the $SiO_{4/2}$ unit, $R^1{}_2R^2SiO_{1/2}$ unit, and $R^1{}_3SiO_{1/2}$ unit wherein $R^1$ is $C_{1-10}$ alkyl and $R^2$ is alkenyl, that contains from 2.5 to 5.0 mass % alkenyl group, and that has a ratio for the total number of moles of $R^1{}_2R^2SiO_{1/2}$ and $R^1{}_3SiO_{1/2}$ units to 1 mole of the $SiO_{4/2}$ unit in the range from 0.7 to 1.1, at from 30 mass % to not more than 50 mass % of component (A).

Component (A-1) has an average of at least two alkenyl groups in each molecule. Component (A-1) has a substantially straight chain molecular structure, but a portion of the molecular chain may be somewhat branched. The alkenyl in component (A-1) can be exemplified by vinyl, allyl, isopropenyl, butenyl, hexenyl, and cyclohexenyl wherein vinyl is preferred. The bonding position for this alkenyl is not limited and may be, for example, the terminal position and/or side chain position on the molecular chain wherein terminal position on the molecular chain is preferred. The alkyl in component (A-1) can be exemplified by $C_{1-10}$ alkyl such as methyl, ethyl, propyl, cyclopentyl, cyclohexyl, and so forth, wherein methyl is preferred.

The viscosity of component (A-1) at 25° C. is in the range from 1,000 mPa·s to 20,000 mPa·s and preferably is in the range from 1,500 mPa·s to 15,000 mPa·s and more preferably is in the range from 2,000 mPa·s to 10,000 mPa·s. When component (A-1) is a mixture of two or more alkenyl-functional dialkylpolysiloxanes, the viscosity of this mixture at 25° C. is preferably in the range from 1,000 mPa·s to 15,000 mPa·s and more preferably is in the range from 2,000 mPa·s to 10,000 mPa·s. As long as the viscosity at 25° C. is in the specified range, component (A-1) may be a mixture of a small amount of an alkenyl-functional dialkylpolysiloxane gum and an alkenyl-functional dialkylpolysiloxane that is a liquid at 25° C. The reasons for the preceding are as follows: when the viscosity of component (A-1) at 25° C. is less than the lower limit cited above, the cured silicone material provided by the cure of the present composition tends to have an unsatisfactory flexibility; when, on the other hand, the viscosity of component (A-1) at 25° C. exceeds the upper limit cited above, the transparency of the cured silicone material provided by the cure of the present composition tends to decline at high temperatures.

This component (A-1) diorganopolysiloxane is exemplified by dimethylpolysiloxanes endblocked at both molecular chain terminals by dimethylvinylsiloxy groups, dimethylsiloxane.methylvinylsiloxane copolymers endblocked at both molecular chain terminals by dimethylvinylsiloxy groups, methylvinylpolysiloxanes endblocked at both molecular chain terminals by trimethylsiloxy groups, dimethylsiloxane.methylvinylsiloxane copolymers endblocked at both molecular chain terminals by trimethylsiloxy groups, and mixtures of two or more of the preceding.

The content of component (A-1) in the present composition is an amount that is at least 50 mass % to not more than 70 mass % of component (A) and preferably is an amount that is at least 50 mass % to not more than 65 mass % of component (A). The reasons for this are as follows: when the component (A-1) content is less than the lower limit on the cited range, the flexibility of the cured silicone material provided by the cure of the present composition tends to decline; when, on the other hand, the component (A-1) content exceeds the upper limit on the cited range, the hardness of the cured silicone material provided by the cure of the present composition tends to decline and surface tack tends to be produced.

The alkenyl-containing, resin-form organopolysiloxane that is component (A-2) imparts a satisfactory hardness and flexibility to the cured silicone material provided by the cure of the present composition and comprises the $SiO_{4/2}$ unit, $R^1{}_2R^2SiO_{1/2}$ unit, and $R^1{}_3SiO_{1/2}$ unit. In these formulas, $R^1$ is $C_{1-10}$ alkyl such as methyl, ethyl, propyl, cyclopentyl, cyclohexyl, and so forth, and $R^2$ is an alkenyl group such as vinyl, allyl, isopropenyl, butenyl, hexenyl, cyclohexenyl, and so forth, wherein vinyl is preferred.

The component (A-2) alkenyl-containing, resin-form organopolysiloxane contains 2.5 to 5.0 mass % alkenyl and preferably contains 3.0 to 4.5 mass % alkenyl. The reasons for this are as follows: when the alkenyl content in component (A-2) is less than the cited lower limit, the hardness of the cured silicone material provided by the cure of the present composition tends to decline and surface tack tends to be produced; when, on the other hand, the alkenyl content in component (A-2) exceeds the cited upper limit, the flexibility of the cured silicone material provided by the cure of the present composition tends to decline and the transparency of the cured silicone material provided by the cure of the present composition tends to decline at high temperatures. Component (A-2) may be a mixture of two or more alkenyl-containing, resin-form organopolysiloxanes, in which case the mixture considered as such must contain 2.5 to 5.0 mass % alkenyl.

The ratio of the total number of moles of $R^1_2R^2SiO_{1/2}$ and $R^1_3SiO_{1/2}$ units to 1 mole of the $SiO_{4/2}$ unit in component (A-2) is in the range from 0.70 to 1.10 and particularly preferably is in the range from 0.75 to 1.05. The reasons for this are as follows: when the ratio of the total number of moles of $R^1_2R^2SiO_{1/2}$ and $R^1_3SiO_{1/2}$ units to 1 mole of the $SiO_{4/2}$ unit in component (A-2) is less than the cited lower limit, the present composition assumes an excessively high viscosity and the handling characteristics tend to decline and component (A-2) takes on an excessively large molecular weight and due to this the transparency of the cured silicone material provided by the cure of the present composition tends to decline; when, on the other hand, the ratio of the total number of moles of $R^1_2R^2SiO_{1/2}$ and $R^1_3SiO_{1/2}$ units to 1 mole of the $SiO_{4/2}$ unit in component (A-2) exceeds the upper limit cited above, the cured silicone material provided by the cure of the present composition tends to have an unsatisfactory flexibility. Component (A-2) may be a mixture of at least two alkenyl-containing, resin-form organopolysiloxanes and is preferably a mixture comprising alkenyl-containing, resin-form organopolysiloxanes for which the ratio of the total number of moles of $R^1_2R^2SiO_{1/2}$ and $R^1_3SiO_{1/2}$ units to 1 mole of the $SiO_{4/2}$ unit is in the range from 0.75 to 1.05.

Component (A-2) has a mass-average molecular weight, on a standard polystyrene basis by gel permeation chromatography, preferably in the range from 3,000 to 7,000 and more preferably in the range from 4,000 to 6,000. Component (A-2) may be a mixture of two or more alkenyl-containing, resin-form organopolysiloxanes and is preferably a mixture comprising alkenyl-containing, resin-form organopolysiloxanes that have a mass-average molecular weight, on a standard polystyrene basis by gel permeation chromatography, in the range from 3,000 to 7,000.

The content of component (A-2) in the present composition is an amount that is at least 30 mass % to not more than 50 mass % of component (A) and preferably is an amount that is at least 35 mass % to not more than 50 mass % of component (A). The reasons for this are as follows: when the component (A-2) content is less than the lower limit on the cited range, the hardness of the cured silicone material provided by the cure of the present composition tends to decline; when, on the other hand, the component (A-2) content exceeds the upper limit on the cited range, the flexibility of the cured silicone material provided by the cure of the present composition tends to decline, the viscosity of the present composition rises excessively and the handling characteristics then tend to decline, and the transparency of the cured silicone material provided by the cure of the present composition tends to decline at high temperatures.

The organopolysiloxane that is component (B) is a crosslinking agent for the present composition and contains at least 0.9 mass % silicon-bonded hydrogen atoms. The reasons for this are as follows: when the silicon-bonded hydrogen content in component (B) is less than the cited range, the cured silicone material provided by the cure of the present composition tends to have a reduced hardness, tends to present surface tack, and tends to have a reduced transparency at high temperatures.

The molecular structure of component (B) can be, for example, straight chain, partially branched straight chain, branched chain, cyclic, or dendritic wherein straight chain, partially branched straight chain, and dendritic are preferred. There are no limitations on the bonding position of the silicon-bonded hydrogen in component (B), and the silicon-bonded hydrogen may be bonded in, for example, terminal position on the molecular chain and/or side chain position on the molecular chain. The silicon-bonded groups in component (B) other than the silicon-bonded hydrogen are alkyl such as methyl, ethyl, propyl, cyclopentyl, cyclohexyl, and so forth, wherein methyl is preferred. This provides a good compatibility with component (A) and also provides an excellent transparency for the cured silicone material provided by the cure of the present composition. While there is no limitation on the viscosity of component (B), its viscosity at 25° C. is preferably in the range from 1 to 10,000 mm$^2$/s and particularly preferably is in the range from 1 to 1,000 mm$^2$/s.

An example of a particularly preferred component (B) is an organopolysiloxane comprising (B-1) an organopolysiloxane that contains at least 0.9 mass % silicon-bonded hydrogen and that comprises the $SiO_{4/2}$ unit and $HR^3_2SiO_{1/2}$ unit wherein $R^3$ is $C_{1-10}$ alkyl such as methyl, ethyl, propyl, cyclopentyl, cyclohexyl, and so forth, with methyl being preferred, at 50 to 100 mass % of component (B), and (B-2) a straight-chain organopolysiloxane that contains at least 0.9 mass % silicon-bonded hydrogen wherein the silicon-bonded groups other than the silicon-bonded hydrogen are $C_{1-10}$ alkyl, at 0 to 50 mass % of component (B).

In addition to the $SiO_{4/2}$ unit and $HR^3_2SiO_{1/2}$ unit, component (B-1) may also contain the $R^3_3SiO_{1/2}$ unit. The ratio of the total number of moles of $HR^3_2SiO_{1/2}$ and $R^3_3SiO_{1/2}$ units to 1 mole of the $SiO_{4/2}$ unit in component (B-1) is preferably in the range from 1.50 to 2.50 and more preferably is in the range from 1.80 to 2.20. A specific example of a preferred component (B-1) is the organopolysiloxane given by $(SiO_{4/2})_4(H(CH_3)_2SiO_{1/2})_8$.

The component (B-2) straight-chain organopolysiloxane contains at least 0.9 mass % silicon-bonded hydrogen atoms, and the silicon-bonded groups therein other than the silicon-bonded hydrogen are $C_{1-10}$ alkyl such as methyl, ethyl, propyl, cyclopentyl, cyclohexyl, and so forth, wherein methyl is preferred. Component (B-2) has a substantially straight chain molecular structure, but a portion of the molecular chain may be somewhat branched. Preferred specific examples of component (B-2) are dimethylsiloxane.methylhydrogensiloxane copolymers endblocked at both molecular chain terminals by dimethylhydrogensiloxy groups, methylhydrogenpolysiloxanes endblocked at both molecular chain terminals by trimethylsiloxy groups, dimethylsiloxane.methylhydrogensiloxane copolymers endblocked at both molecular chain terminals by trimethylsiloxy groups, and mixtures of two or more of the preceding.

The content of component (B) in the present composition is an amount that provides from 0.8 to 2 moles and preferably from 0.9 to 1.5 moles silicon-bonded hydrogen atoms in this component per 1 mole of the total alkenyl in component (A). The reasons for this are as follows: when the component (B) content is less than the lower limit for the cited range, curing of the composition tends to be unsatisfactory; when, on the other hand, the upper limit for the cited range is exceeded, the flexibility and/or transparency of the cured silicone material provided by the cure of the present composition may be diminished.

The hydrosilylation reaction catalyst that is component (C) is a catalyst for promoting curing of the present composition and can be exemplified by platinum-type catalysts, rhodiumtype catalysts, and palladium-type catalysts, wherein the platinum-type catalysts are particularly preferred. These platinum-type catalysts can be exemplified by platinum micropowder, platinum black, platinum supported on silica micropowder, platinum supported on active carbon, chloroplatinic acid, alcohol solutions of chloroplatinic acid, and platinum compounds such as olefin complexes of platinum, alkenylsiloxane complexes of platinum, and so forth.

The component (C) content in the present composition is a catalytic quantity and in specific terms is a quantity that provides 0.01 to 1,000 mass-ppm catalyst metal atoms with reference to the present composition. The reasons for this are as follows: when the component (C) content is less than the lower limit for the cited range, the risk arises that the cure of the resulting composition will not proceed adequately; on the other hand, curing is not significantly promoted by exceeding the upper limit for the cited range, while the risk arises that problems will appear such as discoloration of the cured silicone material.

As other, optional components, the present composition may contain, for example, a reaction inhibitor in order to adjust the cure rate of the present composition, e.g., an alkyne alcohol such as 2-methyl-3-butyn-2-ol, 3,5-dimethyl-1-hexyn-3-ol, 1-ethynyl-1-cyclohexanol, phenylbutynol, and so forth; ene-yne compounds such as 3-methyl-3-penten-1-yne, 3,5-dimethyl-3-hexen-1-yne, and so forth; as well as 1,3,5,7-tetramethyl-1,3,5,7-tetravinylcyclotetrasiloxane, 1,3,5,7-tetramethyl-1,3,5,7-tetrahexenylcyclotetrasiloxane, benzotriazole, and so forth. There is no limitation on the content of this reaction inhibitor in the present composition, and this content may be selected as appropriate as a function of the molding method and curing conditions; however, an amount within the range from 10 to 5,000 mass-ppm with reference to the present composition is generally preferred.

The present composition may incorporate, insofar as the object of the present invention is not impaired, for example, an adhesion promoter, flame retardant, inorganic filler, and so forth. However, as a general matter, an adhesion promoter, flame retardant, and inorganic filler are preferably not incorporated from the perspective of the transparency of the cured silicone material provided by the cure of the present composition.

When the cured silicone material provided by the cure of the present composition is to be used in electrical•electronic applications, the content in the present composition of low molecular weight organopolysiloxane having a molecular weight not more than 650 is preferably not more than 350 ppm.

The viscosity of the present composition at 25° C. is not particularly limited, but considered from the standpoint of the moldability and handling characteristics, i.e., ease of pouring or injection, ease of degassing, and so forth, the viscosity of the present composition at 25° C. is preferably 1 to 100 Pa·s and particularly preferably is 2 to 50 Pa·s.

The present composition forms a cured silicone material when cured by heating to 100 to 250° C. This cured silicone material according to the present invention has a hardness, as measured using the type A durometer specified in JIS K 6253, in the range from at least 80 to not more than 95, preferably in the range from more than 80 to not more than 90, and more preferably in the range from at least 85 to not more than 90. The reasons for this are as follows: the strength tends to decline when the cured silicone material has a hardness that is less than the lower limit for the cited range; when, on the other hand, the upper limit for the cited range is exceeded, the flexibility of the cured silicone material under consideration tends to be inadequate.

In order to exhibit a satisfactory flexibility, this cured silicone material must have an elongation as specified in JIS K 6251 of at least 30%. The reason for this is that the flexibility of the cured silicone material becomes unsatisfactory at below the indicated range. This flexibility refers to the presence of a bending tolerance whereby fissuring and rupture do not occur even which the 1 mm-thick cured silicone material is bent 180°.

The present cured silicone material must have a parallel light transmittance at 25° C., measured in accordance with JIS K 7105 on the 6 mm-thick cured silicone material, i.e., on a 6 mm optical path length, of at least 90%, and must have a parallel light transmittance at 200° C. that is a value that is at least 99% of the parallel light transmittance at 25° C. The reason for this is that deficiencies may occur in optical component applications when the present cured silicone material has a parallel light transmittance at 200° C. that is less than 99% of the parallel light transmittance at 25° C.

In addition, the present cured silicone material may be a composite in which the cured silicone material is formed into a single article with any of various substrates. The substrate can be exemplified by various metals, thermoplastic plastics, thermosetting plastics, rubbers such as silicone rubbers and so forth, backing fabrics such as those made of nylon or polyester, electronic parts and components, and light-emitting elements. Such a cured silicone composite can be obtained by coating the present composition on a substrate and then thermosetting.

EXAMPLES

The curable silicone composition of the present invention will be described in detail through examples and comparative examples. In the examples, the viscosity is the value at 25° C. and parts indicates mass parts.

The nature and designation of the materials used in the following examples for components (A)-(C) and the reaction inhibitor as a cure retarder are as indicated below. Here, Vi designates the vinyl group while Me designates the methyl group.

Component A-1 a-1: a dimethylpolysiloxane endblocked by dimethylvinylsiloxy groups at both molecular chain terminals, that has a viscosity of 500 mPa·s and a vinyl group content of 0.45 mass %.

a-2: a dimethylpolysiloxane endblocked by dimethylvinylsiloxy groups at both molecular chain terminals, that has a viscosity of 2,000 mPa·s and a vinyl group content of 0.23 mass %.

a-3: a dimethylpolysiloxane endblocked by dimethylvinylsiloxy groups at both molecular chain terminals, that has a viscosity of 10,000 mPa·s and a vinyl group content of 0.14 mass %.

a-4: a dimethylpolysiloxane endblocked by dimethylvinylsiloxy groups at both molecular chain terminals, that has a viscosity of 40,000 mPa·s and a vinyl group content of 0.10 mass %.

Component A-2 a-5: an organopolysiloxane given by the average unit formula $(ViMe_2SiO_{1/2})_{0.06}(Me_3SiO_{1/2})_{0.38}(SiO_{4/2})_{0.56}$, that has a mass-average molecular weight of approximately 4,600, a vinyl group content of 1.6 mass %, and a ratio of the total number of moles of $R^1{}_2R^2SiO_{1/2}$ and $R^1{}_3SiO_{1/2}$ units to 1 mole of the $SiO_{4/2}$ unit of 0.79.

a-6: an organopolysiloxane given by the average unit formula $(ViMe_2SiO_{1/2})_{0.11}(Me_3SiO_{1/2})_{0.33}(SiO_{4/2})_{0.56}$, that has a mass-average molecular weight of approximately 4,600, a vinyl group content of 4.2 mass %, and a ratio of the total number of moles of $R^1{}_2R^2SiO_{1/2}$ and $R^1{}_3SiO_{1/2}$ units to 1 mole of the $SiO_{4/2}$ unit of 0.79.

a-7: an organopolysiloxane given by the average unit formula $(ViMe_2SiO_{1/2})_{0.06}(Me_3SiO_{1/2})_{0.44}(SiO_{4/2})_{0.50}$, that has a mass-average molecular weight of approximately 4,000, a vinyl group content of 5.5 mass %, and a ratio of the total number of moles of $R^1{}_2R^2SiO_{1/2}$ and $R^1{}_3SiO_{1/2}$ units to 1 mole of the $SiO_{4/2}$ unit of 1.00.

a-8: an organopolysiloxane given by the average unit formula $(ViMe_2SiO_{1/2})_{0.09}(Me_3SiO_{1/2})_{0.41}(SiO_{4/2})_{0.50}$, that has a mass-average molecular weight of approximately 4,600, a vinyl group content of 3.4 mass %, and a ratio of the total number of moles of $R^1{}_2R^2SiO_{1/2}$ and $R^1{}_3SiO_{1/2}$ units to 1 mole of the $SiO_{4/2}$ unit of 1.00.

a-9: an organopolysiloxane given by the average unit formula $(ViMe_2SiO_{1/2})_{0.14}(Me_3SiO_{1/2})_{0.48}(SiO_{4/2})_{0.39}$, that has a mass-average molecular weight of approximately 2,500, a vinyl group content of 5.0 mass %, and a ratio of the total number of moles of $R^1{}_2R^2SiO_{1/2}$ and $R^1{}_3SiO_{1/2}$ units to 1 mole of the $SiO_{4/2}$ unit of 1.59.

Component B b-1: an organopolysiloxane given by the average unit formula $(HMe_2SiO_{1/2})_8(SiO_{4/2})_4$, that has a kinematic viscosity of 18 mm$^2$/s and a silicon-bonded hydrogen atom content of approximately 0.97 mass %.

b-2: a polymethylhydrogensiloxane endblocked at both molecular chain terminals by trimethylsiloxy groups, that has a kinematic viscosity of 21 mm$^2$/s and a silicon-bonded hydrogen atom content of approximately 1.57 mass %.

b-3: a dimethylsiloxane.methylhydrogensiloxane copolymer endblocked by trimethylsiloxy groups at both molecular chain terminals, that has a kinematic viscosity of 5 mm$^2$/s and a silicon-bonded hydrogen atom content of approximately 0.75 mass %.

Component C platinum catalyst: a 1,3-divinyltetramethyldisiloxane solution of a 1,3-divinyltetramethyldisiloxane complex of platinum. The platinum metal content is approximately 6500 ppm.

Reaction Inhibitor as a Cure Retarder 3,5-dimethyl-1-octyn-3-ol

Examples 1 to 4 and Comparative Examples 1 to 6

The materials shown in Tables 1 and 2 were mixed to uniformity in the quantity proportions shown in Tables 1 and 2 to produce curable silicone compositions. The resulting compositions were heated for 5 minutes at 150° C. to produce the 1 mm-thick cured sheet, which was submitted to measurement of the tensile strength and elongation and to flexibility confirmation testing. The compositions were also heated for 10 minutes at 150° C. to produce the 6 mm-thick cured silicone material, which was submitted to measurement of the hardness, parallel light transmittance at 25° C., and parallel light transmittance at 200° C., and the parallel light transmittance retention rate at 200° C. was calculated. The results are given in Tables 1-2. The SiH/Vi in Tables 1 and 2 indicates the ratio of the number of moles of silicon-bonded hydrogen in component (B) per 1 mole of the vinyl group in components (A-1) and (A-2).

Test, Measurement, and Evaluation Methods

The properties (hardness, tensile strength, elongation, and light transmission) of the cured silicone material were tested, measured, or evaluated using the following methods. The flexibility confirmation testing was also carried out as described below.

(1) Hardness

A 6 mm-thick cured silicone material was fabricated by curing the curable silicone composition by heating for 10 minutes at 150° C. The hardness of this cured silicone material was measured using the type A durometer specified in JIS K 6253.

(2) Tensile Strength and Elongation

A 1 mm-thick cured silicone material was fabricated by curing the curable silicone composition by heating for 5 minutes at 150° C. The tensile strength and elongation of this cured silicone material were measured according to the methods specified in JIS K 6251.

(3) Flexibility Confirmation Testing

A 1 mm-thick cured sheet was prepared by heating the curable silicone composition for 5 minutes at 150° C. A #4 dumbbell was punched out of the resulting cured sheet; the middle of the dumbbell was bent 180°; an approximately 500 g weight with a diameter of 4 cm and a height of 4 cm was placed on this region for 2 seconds; the weight was removed; and the bending tolerance was evaluated by visual inspection of the presence/absence of whitening, fissuring, and breakage in the middle of the dumbbell. An evaluation of "pass" was made when whitening, fissuring, and cracking were absent, while an evaluation of "fail" was made when whitening, fissuring, and breakage were observed.

(4) Light Transmission

A 6 mm-thick cured sheet was fabricated by heating the curable silicone composition for 10 minutes at 150° C. The parallel light transmittance at 25° C. and 200° C. for a 6 mm optical path length was measured on the resulting cured sheet based on JIS K 7105 using a Water Analyzer-200N from Nippon Denshoku Industries Co., Ltd. Air was used as the reference. The parallel light transmittance at 200° C. is the value measured as follows: the cured sheet is fixed in advance in a sample holder and is then heated for 10 minutes in a 200° C. oven, after which the cured sheet is removed from the oven; measurement is then performed within 20 seconds. The parallel light transmittance at 200° C. measured as described in the preceding was calculated as the percentage with respect to the parallel light transmittance at 25° C., and this is reported in Tables 1 and 2 as the parallel light transmittance retention rate in %.

TABLE 1

| | | | Example 1 | Example 2 | Example 3 | Example 4 |
|---|---|---|---|---|---|---|
| (A-1) | (parts) | a-1 | | | | |
| | | a-2 | 55 | | | 57 |
| | | a-3 | | 60 | 60 | |
| | | a-4 | | | | |
| (A-2) | (parts) | a-5 | | | | |
| | | a-6 | | 40 | 40 | |
| | | a-7 | | | | |
| | | a-8 | 45 | | | 43 |
| | | a-9 | | | | |
| (B) | (parts) | b-1 | 11.9 | 10.1 | | 9.8 |
| | | b-2 | | | 7.1 | |
| | | b-3 | | | | |
| (C) | (parts) | | 0.08 | 0.08 | 0.08 | 0.08 |
| reaction inhibitor (parts) | | | 0.1 | 0.1 | 0.1 | 0.1 |
| SiH/Vi | | | 1.9 | 1.5 | 1.7 | 1.7 |
| hardness | | | 87 | 88 | 82 | 83 |
| Tb (MPa) | | | 9.7 | 10.4 | 8.6 | 10.8 |
| Eb (%) | | | 50 | 45 | 30 | 45 |
| parallel light transmittance (%) | | | 93 | 93 | 92 | 93 |

TABLE 1-continued

|  | Example 1 | Example 2 | Example 3 | Example 4 |
|---|---|---|---|---|
| parallel light transmittance retention rate (%) | 100 | 100 | 100 | 100 |
| flexibility confirmation testing | pass | pass | pass | pass |

TABLE 2

|  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| (A-1) | (parts) | a-1 |  |  |  |  | 60 |  |
|  |  | a-2 | 55 |  |  |  |  | 57 |
|  |  | a-3 |  |  | 54 | 60 |  |  |
|  |  | a-4 |  | 55 |  |  |  |  |
| (A-2) | (parts) | a-5 | 45 |  |  |  |  |  |
|  |  | a-6 |  | 45 | 34 |  | 40 |  |
|  |  | a-7 |  |  |  | 40 |  |  |
|  |  | a-8 |  |  |  |  |  | 43 |
|  |  | a-9 |  |  | 12 |  |  |  |
| (B) | (parts) | b-1 | 4.9 | 11.2 | 12.1 | 11.4 | 10.4 |  |
|  |  | b-2 |  |  |  |  |  |  |
|  |  | b-3 |  |  |  |  |  | 15 |
| (C) | (parts) |  | 0.08 | 0.08 | 0.08 | 0.08 | 0.08 | 0.08 |
| reaction inhibitor (parts) |  |  | 0.1 | 0.1 | 0.1 | 0.1 | 0.1 | 0.1 |
| SiH/Vi |  |  | 1.6 | 1.5 | 1.5 | 1.3 | 1.4 | 1.9 |
| hardness |  |  | 67 | 85 | 87 | 92 | 85 | 76 |
| Tb (MPa) |  |  | 12.4 | 7.4 | 6.4 | 7.5 | 4.6 | 12 |
| Eb (%) |  |  | 95 | 40 | 25 | 22 | 15 | 120 |
| parallel light transmittance (%) |  |  | 93 | 87 | 93 | 91 | 93 | 93 |
| parallel light transmittance retention rate (%) |  |  | 100 | 90 | 100 | 95 | 100 | 97 |
| flexibility confirmation testing |  |  | pass | pass | fail | fail | fail | pass |

INDUSTRIAL APPLICABILITY

The curable silicone composition of the present invention, because it forms a flexible and highly transparent cured silicone material that is free of surface tack, is useful as an optical member or component that is permeable to light, e.g., visible light, infrared, ultraviolet, far ultraviolet, x-ray, laser, and so forth. In particular, because the cured silicone material provided by the cure of the curable silicone composition of the present invention does not undergo temperature-induced variations in transparency, this cured silicone material is well suited for use as an optical member or component for devices involved with high energy, high output light. In addition, a flexible, surface tack-free, and highly transparent cured silicone layer can be formed on the surface of any of various substrates, e.g., silicone rubbers, backing fabrics made of nylon or polyester, and so forth, by the formation of a single article with a substrate by coating the surface of the substrate with the curable silicone composition of the present invention and then thermosetting, and as a consequence the curable silicone composition of the present invention is also useful as a coating material and a surface layer material.

The cured silicone material of the present invention, because it is flexible and highly transparent and lacks surface tack, is useful as an optical member or component that is permeable to light, e.g., visible light, infrared, ultraviolet, far ultraviolet, x-ray, laser, and so forth. The cured silicone material of the present invention is also useful as an optical member or component that must be flexible, e.g., due to use in a flexed or bent condition, and, because it also exhibits an excellent moldability and excellent handling properties, it is additionally useful as a thin film or superfine optical member or component and as an optical member or component of very small size, and is also useful as an optical member or component for devices involved with high energy, high output light. In addition, an article or component having a flexible, surface tack-free, and highly transparent cured silicone layer can be made by making a composite in which the cured silicone material of the present invention is formed into a single article or body with any of various substrates, and an impact- and stress-relaxing function can also be expected from the cured silicone layer.

The invention claimed is:

1. A curable silicone composition that provides a bending-tolerant and highly transparent cured silicone material, said composition comprising
   (A) 100 mass parts of an alkenyl-containing organopolysiloxane comprising
      (A-1) a dialkylpolysiloxane that has an average of at least two alkenyl groups in each molecule and a viscosity at 25° C. of at least 1,000 mPa·s to not more than 20,000 mPa·s, at from 50 mass % to not more than 70 mass % of component (A), and
      (A-2) an alkenyl-containing, resin-form organopolysiloxane that comprises the $SiO_{4/2}$ unit, $R^1{}_2R^2SiO_{1/2}$ unit, and $R^1{}_3SiO_{1/2}$ unit wherein $R^1$ is $C_{1-10}$ alkyl and $R^2$ is alkenyl, that contains from 2.5 to 5.0 mass % alkenyl group, and that has a ratio for the total number of moles of $R^1{}_2R^2SiO_{1/2}$ and $R^1{}_3SiO_{1/2}$ units to 1 mole of the $SiO_{4/2}$ unit in the range from 0.70 to 1.10, at from 30 mass % to not more than 50 mass % of component (A);
   (B) an organopolysiloxane that contains at least 0.9 mass % silicon-bonded hydrogen wherein the silicon-bonded groups other than the silicon-bonded hydrogen are $C_{1-10}$ alkyl, in an amount that provides 0.8 to 2 moles silicon-bonded hydrogen in this component per 1 mole of the total alkenyl in component (A); and
   (C) a hydrosilylation reaction catalyst in a catalytic quantity, and provides a bending-tolerant and highly transparent cured silicone material that has a hardness measured using the type A durometer specified in JIS K 6253 in the range from 80 to 95, an elongation as specified in JIS K 6251 of at least 30%, a parallel light transmittance at 25° C. measured in accordance with JIS K 7105 on a 6 mm optical path length of at least 90%, and the parallel light transmittance at 200° C. of a value that is at least 99% of the parallel light transmittance at 25° C.

2. The curable silicone composition according to claim 1, wherein component (B) is an organopolysiloxane comprising
   (B-1) an organopolysiloxane that contains at least 0.9 mass % silicon-bonded hydrogen and that comprises the $SiO_{4/2}$ unit and $HR^3{}_2SiO_{1/2}$ unit wherein $R^3$ is $C_{1-10}$ alkyl, at 50 to 100 mass % of component (B), and
   (B-2) a straight-chain organopolysiloxane that contains at least 0.9 mass % silicon-bonded hydrogen wherein the silicon-bonded groups other than the silicon-bonded hydrogen are $C_{1-10}$ alkyl, at 0 to 50 mass % of component (B).

3. A bending-tolerant and highly transparent cured silicone material provided by the thermosetting of a curable silicone composition comprising
   (A) 100 mass parts of an alkenyl-containing organopolysiloxane comprising
      (A-1) a dialkylpolysiloxane that has an average of at least two alkenyl groups in each molecule and a viscosity at 25° C. of at least 1,000 mPa·s to not more than 20,000 mPa·s, at from 50 mass % to not more than 70 mass % of component (A), and
      (A-2) an alkenyl-containing, resin-form organopolysiloxane that comprises the $SiO_{4/2}$ unit, $R^1{}_2R^2SiO_{1/2}$ unit, and $R^1{}_3SiO_{1/2}$ unit wherein $R^1$ is $C_{1-10}$ alkyl and $R^2$ is alkenyl, that contains from 2.5 to 5.0 mass % alkenyl group, and that has a ratio for the total number of moles of $R^1{}_2R^2SiO_{1/2}$ and $R^1{}_3SiO_{1/2}$ units to 1 mole of the $SiO_{4/2}$ unit in the range from 0.70 to 1.10, at from 30 mass % to not more than 50 mass % of component (A);
   (B) an organopolysiloxane that contains at least 0.9 mass % silicon-bonded hydrogen wherein the silicon-bonded groups other than the silicon-bonded hydrogen are $C_{1-10}$ alkyl, in an amount that provides 0.8 to 2 moles silicon-bonded hydrogen in this component per 1 mole of the total alkenyl in component (A); and
   (C) a hydrosilylation reaction catalyst in a catalytic quantity, and has a hardness measured using the type A durometer specified in JIS K 6253 in the range from 80 to 95, an elongation as specified in JIS K 6251 of at least 30%, a parallel light transmittance at 25° C. measured in accordance with JIS K 7105 on a 6 mm optical path length of at least 90%, and a value for the parallel light transmittance at 200° C. that is at least 99% of the parallel light transmittance at 25° C.

4. The bending-tolerant and highly transparent cured silicone material according to claim 3, wherein component (B) is an organopolysiloxane comprising
   (B-1) an organopolysiloxane that contains at least 0.9 mass % silicon-bonded hydrogen and that comprises the $SiO_{4/2}$ unit and $HR^3{}_2SiO_{1/2}$ unit wherein $R^3$ is $C_{1-10}$ alkyl, at 50 to 100 mass % of component (B), and
   (B-2) a straight-chain organopolysiloxane that contains at least 0.9 mass % silicon-bonded hydrogen wherein the silicon-bonded groups other than the silicon-bonded hydrogen are $C_{1-10}$ alkyl, at 0 to 50 mass % of component (B).

5. A cured silicone composite characteristically comprising a substrate that forms a single article with a cured silicone layer that is provided by the thermosetting of a curable silicone composition according to claim 1.

6. A cured silicone composite obtained by coating the curable silicone composition according to claim 1 on a substrate and then thermosetting the curable silicone composition.

* * * * *